3,422,179
METHOD OF MAKING THERMOPLASTIC WELDING FITTING

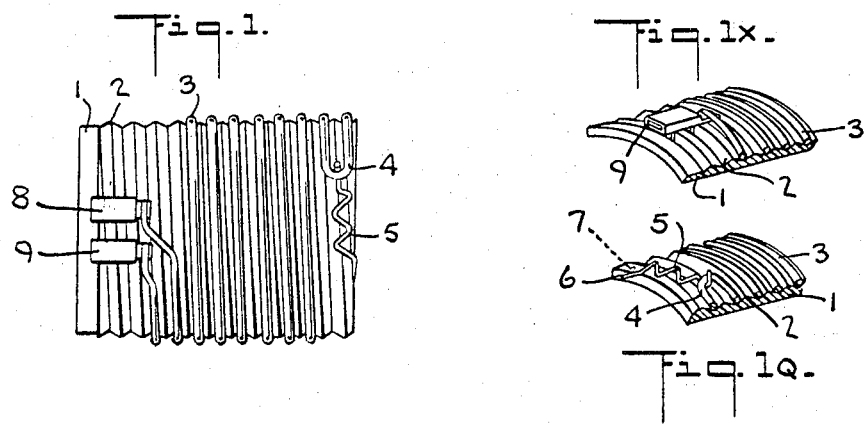
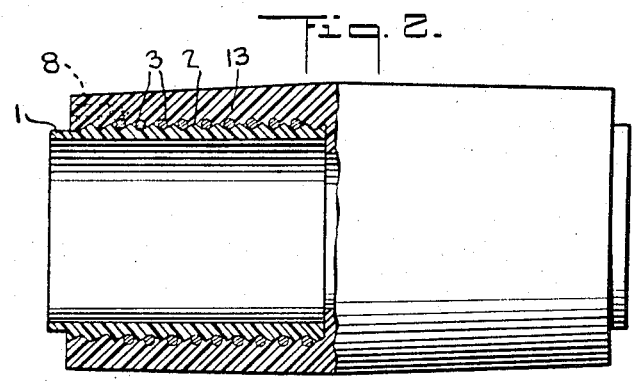
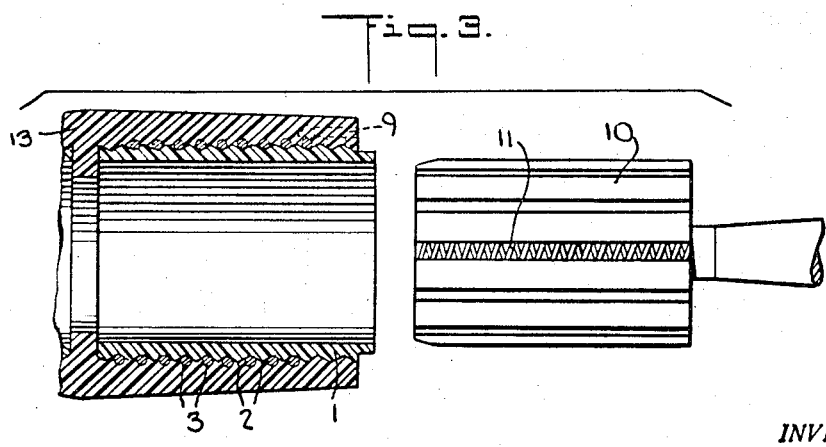

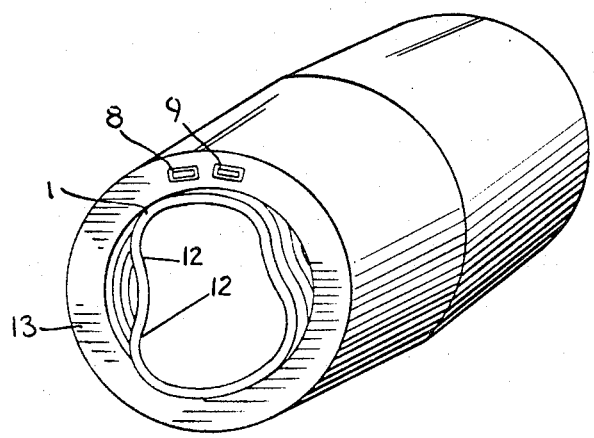
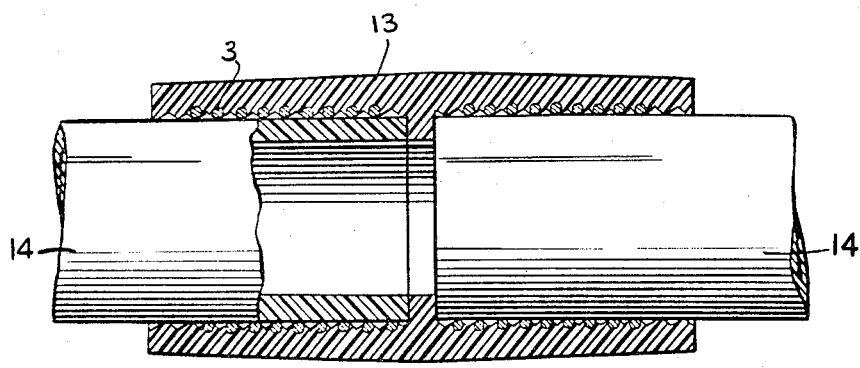

Hans Bauer, Neu-Ulm, and Helmut Holzer, Ulm, Germany, assignors to Sud-West-Chemie G.m.b.H., Neu-Ulm, Germany, a corporation of Germany
Continuation-in-part of application Ser. No. 242,340, Nov. 2, 1962. This application Nov. 16, 1966, Ser. No. 594,948
Claims priority, application Germany, Feb. 17, 1958, S 56,991
U.S. Cl. 264—272                                  5 Claims
Int. Cl. B29c 7/00; B29g 3/00

The invention relates to a method for the manufacture of a welding fitting which consists of a thermoplastic sleeve having embedded in its inner surface a metallic heating element, more especially a bifilar coil of heating wire which can be connected to a source of electric current.

This is a continuation-in-part of our copending application Ser. No. 242,340, now abandoned, filed Nov. 2, 1962, which was a division of U.S. 3,062,940 granted Nov. 2, 1962.

The manufacture of such fittings by the injection molding process presents a number of economic and technical difficulties. The winding of the heating wire, for instance, the bifilar heating wire, must be manually wound on the core of the injection mold before the fitting sleeve is injection-molded over the core, which necessitates the provision of a very large number of cores. This is a very uneconomical procedure.

In addition, conventionally manufactured welding fittings frequently exhibit defective positioning of the heating wire coil, thus causing displacement of the wires towards each other on inserting the tubes to be connected by the fittings and resulting, on welding, in short circuits and defective weldings.

It is an object of the invention to provide a method of manufacturing welding fittings, which obviates the disadvantages and which can be carried out easily and economically. The resultant fittings are safeguarded against short-circuits, are reliable in welding together tubes attached thereto and produce excellent, uniform welds when a current is applied to the metallic heating element, especially to a bifilar winding.

The invention makes use of two welding fitting components, the first being a carrier tube which can be manufactured at a different place and a different time and stored prior to being used in the manufacture of the fitting by injection molding independently therefrom and which, if necessary, can be shipped to a remote injection molding plant.

The second welding fitting component is a welding sleeve which is manufactured by injection molding. The welding sleeve with its carrier tube can be stored, shipped, and handled without any difficulties and without danger of mechanical damage, the heating elements and the welding surface of the sleeve being protected against chemical influences, for instance, the atmosphere. The welding sleeve can easily be detached from the carrier tube to produce a welding fitting ready for use, even by unskilled labor.

According to the invention, a heating element is mounted on a thin-walled carrier tube made of a thermoplastic material and having screw-threads on its outer surface wherein the heating element is laid. The carrier tube is then positioned, or mounted, on a core of an injection mold. A sleeve of a thermoplastic plastic is injection molded around the carrier tube whereby the heating element is attached in the sleeve at the interface of the sleeve and the outer carrier tube wall and the sleeve is detachably united to the carrier tube. The thermoplastic plastic of the carrier tube may then be heated to soften the same and to detach the carrier tube from the fitting sleeve and heating element without displacing the element from the sleeve or detaching it in any way from its position in the sleeve.

The fitting sleeve according to the invention can consist of any desired thermoplastic plastic, provided that it is capable of being welded. Polyethylene, especially high-pressure polyethylene, and also low-pressure polyethylene or a polyethylene copolymer can advantageously be used as material for the fitting sleeve.

Thermoplastic plastics having a softening point lower than the softening point of the thermoplastic plastic of the sleeve, for instance, polyvinyl chloride compared to polyethylene, are suitable as materials for the carrier tube. The tube is united with the fitting sleeve during injection molding, whereby the heating conductor, i.e. the heating element, provided thereon, for instance, wound thereon, is embedded in the fitting sleeve. Subsequently, the tube, being of a material having a lower softening point than that of the sleeve, can be heated to detach it from the fitting sleeve. The heat conductor remains embedded in the fitting sleeve.

If care is taken that no firm union of the carrier tube with the fitting sleeve is effected during injection molding, it is possible that, under certain circumstances, the thermoplastic plastic material of the tube may be the same as that of the fitting sleeve. This is possible when injection molding is so conducted that the heat of the injected material is not sufficient for melting or softening and displacing the material of the tube by the injected material.

It is preferred to use a thermoplastic material for the tube which is different from material of the fitting sleeve. Preferably, a thermoplastic material softening comparatively rapidly at a relatively low temperature is used therefor.

When polyethylene is used as the material of the fitting sleeve, polyvinyl chloride, more especially rigid polyvinyl chloride, is suitable as tube material. The thickness of the wall of the tube which is united with the injection molded fitting sleeve in a manner which permits its release on heating can vary according to the especially chosen plastic material, a condition being that the tube must have adequate strength at room temperature in order to withstand the tight winding of the heating wire therein and, on the other hand, must be sufficiently lacking in rigidity on heating so that it can be deformed and pulled out of, and removed from, the fitting sleeve without displacing or detaching the heating element from its position in the sleeve.

With fitting sleeves having an internal diameter of about 5 cm. and when using polyvinyl chloride, for instance, rigid polyvinyl chloride, as tube material, wall thicknesses of the tubes of 2 mm., 1.5 mm. and even 1 mm. are suitable, as such thin-walled tubes have adequate strength at room temperature, and when heated, for instance, to 80° C., show a sufficient lack of rigidity to allow them to be deformed and removed.

The thin-walled carrier tube of thermoplastic material is provided with screw-threads which facilitate the winding of the bifilar heating coil thereon, safeguard against displacement of the wire coils on injection moldings, and secure the wire end loops. Contact sockets which are to be embedded in the fitting sleeve are attached to the connecting ends of the heating coil and are placed on the carrier tube, and the end loop of the wire is fixed to the tube. Both these steps are possible, especially with rigid polyvinyl chloride, by introducing fixing members, for instance, pins, into the wall of the tube whereby these pins are provided at the contact sockets and whereby the end loop is secured by attaching thereto a holding element for instance, a section of spring wire, which is embedded in the end of the tube.

During injection molding, this thin-walled carrier tube is so united with the fitting sleeve that a comparatively firm bond is formed at room temperatures. On heating the tube, the latter can readily be deformed, released, and withdrawn from the fitting sleeve, without displacing or detaching the heating element from the sleeve, for instance, after mechanically detaching an annular rim surface of the tube.

The product of this method is a welding fitting with an inner protective tube which remains united with the welding fitting until the latter is ready for use.

Such a welding fitting, the embedded heating conductor and the welded surface of which are protected against mechanical and chemical influences, has considerable advantages over known fittings, since stacking and handling without danger of damage is facilitated.

The removal of the thin-walled, thermoplastic carrier tube by heating, deformation, and withdrawing without moving the heating element can readily be carried out even by unskilled labor, for instance, at the place of use. The tube is heated only sufficiently high enough to deform, or soften it, without the material of the welding fitting sleeve being substantially softened or the element becoming moved from its positive in the sleeve. Thus, the carrier tube can be removed without the heating element becoming detached from the sleeve or the sleeve becoming distorted.

Any method can be used for heating the protective carrier tube. Heating could be effected by using the heating conductor of the fitting. In this case, however, damage could be caused to the fitting, or the element could become detached, so that, according to a preferred embodiment, heating of the carrier tube is effected from the inside of the tube, more especially by introducing a heating member touching the inner surface of the tube, such as an electric heating member of circular cross-section.

When such a heating member, for instance, an electrically heated mandrel of circular cross-section, is introduced into the tube, the tube softens within a short period of time, for instance, within 60 seconds, after applying a current to the heating member, whereafter the heating member is withdrawn from the tube. After loosening the annular edge of the tube, for instance, by means of any suitable instrument, such as a screwdriver (damage to the turns of wire at this annular edge surface is not to be feared, because the wire turns usually do not reach the rim of the fitting according to the invention), the tube can be gripped with a pair of pliers, can be bent inwardly towards the center and thereby detached and removed from the fitting sleeve without any damage to the latter of the heating conductor embedded therein, since the connection between the tube and the fitting is comparatively non-rigid and the tube, because of the material from which it is made, is so flabby that damage to the fitting consisting, for instance, of polyethylene, by the tube material which is soft, when warmed, is avoided.

If the protective thin-walled carrier tube is detached from the fitting sleeve at the place of use, previous damaging influence on the welding surface and on the embedded wire is not to be feared and the welding proceeds easily and reliably.

The drawings show preferred embodiments of the invention.

FIG. 1 is a side elevation of the carrier tube provided with a heating coil.

FIGS. 1x and 1q are perspective views of portions of the carrier tube.

FIG. 2 is an elevation, partly in section, of the initial welding fitting product with the protective carrier tube.

FIG. 3 is a side elevation of the heating mandrel immediately before insertion into the product of FIG. 2, shown in cross section.

FIG. 4 is a perspective view showing the heated and deformed carrier tube shortly before release and withdrawing, while FIG. 5 is a section showing the welding fitting sleeve of FIG. 2 applied over the ends of adjacent tubes welded together by the sleeve.

The thin-walled carrier tube 1 (the internal diameter of which corresponds to the external diameter of the core of the injection mold used for molding the fitting sleeve) has on its surface a screw-thread 2, in which the heating wire 3 is laid, this wire having an end loop 4 held by element 5 consisting, for instance, of steel wire, which is connected to the tube 1 by introducing its end 6 into a hole 7 in the end face of the tube. Contact sockets 8 and 9 with their fixing pins are let into the surface of the tube at the other end of the latter.

The intermediate fitting product is produced by slipping the carrier tube 1 over the core of an injection mold and injection molding the welding sleeve 13 about the carrier tube (see FIG. 2).

The heating mandrel 10 is provided with an electric heating element 11. It quickly heats the tube 1 when inserted thereinto, the rim of which is then softened and may be engaged by a pair of pliers at 12 and, as shown in FIG. 4, is deformed and, in fact, bent inwardly, so that the protective tube can easily be extracted to provide the completed fitting (FIG. 5) with wire turns 3 disposed undisturbed on the internal surface thereof. The resulting thermoplastic welding fitting may then be placed over the ends of two tubes 14, and upon heating the wire 3, the plastic materials of the tube ends and the welding sleeve 13 will be fused together.

The invention is illustrated in the following example for the joining of polyethylene pipe ends of 90 mm. outer diameter.

A tube consisting of unplasticized polyvinyl chloride (PVC) and having an internal diameter of 85 mm., a wall thickness of 3 mm., and a length of 80 mm., with outside screw-threads, is used as a carrierr for the heating element. The heating element comprises a copper wire of 0.55 mm. diameter with an electrical resistance of 0.09 ohm per meter and a total length of 13 meters wound onto the screw-threads of the carrier and fixed at one end of the bifilar coil by means of a pin, and at the other end being fitted with connecting sockets which are anchored to the mold by removable adaptors, as illustrated in the accompanying drawing.

In the process of manufacturing a welding sleeve, the above assembly (consisting of the carrier tube and the heating element) is placed on the detachable core (with an outside diameter of 85 mm.) of an injection mold, as used in a known manner for the forming of sleeves or fittings from polyethylene.

In the aforesaid instance, the properties of the polyethylene material are as follows:

Melt index (according to BSS 1972:1953):1.5. Molecular weight (approx.):100,000. Specific gravity:0.96.

After being stored and shipped to the place of use, the sleeve, with the heating conductor embedded in its inside walls and with the carrier still attached as a protective element, is heated by inserting for a period of 80 seconds a mandrel having a temperature of 120° C., resulting in the softening of the carrier material and allowing its subsequent removal from the sleeve which is then ready for forming welded joints of polyethylene pipes according to methods of prior art.

We claim:
1. A method for manufacturing a thermoplastic welding fitting sleeve provided with an electrically conductive heating element attached at its inner wall comprising
   (a) winding and attaching a bifilar heating element in the screw-threads of a thin-walled carrier tube of thermoplastic material having screw-threads on its outer surface wherein said element is laid,
   (b) positioning said carrier tube and element over a core of an injection mold,

(c) injection molding a sleeve of thermoplastic material around said carrier tube and element whereby said element is attached in the sleeve at the interface of the sleeve and the outer carrier tube wall and the sleeve is detachably united with the tube, the thermoplastic material of said carrier tube essentially having a softening point lower than the softening point of the thermoplastic material of said sleeve, (d) heating said carrier tube to a temperature below the softening point of said sleeve, but sufficiently high enough to soften said carrier tube to permit it to be removed from said element and sleeve, and (e) removing said tube from said element and sleeve, without displacing or detaching said element from its position in said sleeve.

2. The method according to claim 1 wherein the heating element is a wire.

3. The method according to claim 1 wherein the thermoplastic material of the carrier tube is unplasticized polyvinyl chloride and the thermoplastic material of the sleeve is polyethylene having a softening point lower than said polyvinyl chloride.

4. The method according to claim 1 wherein the heating element is provided with a pair of contact sockets, one attached at each connecting end of said element, and said sockets are positioned at an end of said tube.

5. The method according to claim 1 in which heating of said carrier tube to a softening point below that of the sleeve is carried out by inserting an electrically heated mandrel into the interior of said tube for a period of time sufficient to soften said tube material to permit removing said tube from said sleeve and heating element without displacing or detaching said element from its position in said sleeve.

References Cited

UNITED STATES PATENTS

| 786,257 | 4/1905 | Beebe | 264—272 |
| 2,516,766 | 7/1950 | Gibbs et al. | 264—257 |
| 2,739,350 | 3/1956 | Lampman | 264—221 |

ROBERT F. WHITE, *Primary Examiner.*

T. J. CARVIS, JR., *Assistant Examiner.*

U.S. Cl. X.R.

264—278, 317, 318; 156—275; 285—21, 423